(12) United States Patent
Kokenos

(10) Patent No.: US 9,538,209 B1
(45) Date of Patent: Jan. 3, 2017

(54) IDENTIFYING ITEMS IN A CONTENT STREAM

(75) Inventor: Danae M. Kokenos, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 122 days.

(21) Appl. No.: 12/732,963

(22) Filed: Mar. 26, 2010

(51) Int. Cl.
*H04N 7/173* (2011.01)
*H04N 21/235* (2011.01)
*H04N 21/431* (2011.01)
*H04N 5/445* (2011.01)

(52) U.S. Cl.
CPC ...... *H04N 21/2353* (2013.01); *H04N 21/4316* (2013.01)

(58) Field of Classification Search
CPC .............. H04N 21/235; H04N 21/2353; H04N 21/26283; H04N 21/431; H04N 21/4318; H04N 21/4316; H04N 21/4312; H04N 21/4355; H04N 21/4622; H04N 21/432; H04N 21/47205; H04N 21/478; H04N 21/47815; H04N 21/4782; H04N 21/488; H04N 21/4886; H04N 21/80; H04N 21/812; H04N 21/8126; H04N 21/8133; H04N 21/8146; H04N 21/8166; H04N 21/8352; H04N 21/8358; H04N 21/84; H04N 21/85; H04N 21/8545; H04N 21/858; H04N 21/8586
USPC .... 725/23, 2, 6, 8, 113, 136, 42, 37, 14, 19, 725/20; 386/241
See application file for complete search history.

(56) References Cited

U.S. PATENT DOCUMENTS

| | | | | |
|---|---|---|---|---|
| 5,249,044 | A * | 9/1993 | Von Kohorn | 725/23 |
| 5,872,588 | A * | 2/1999 | Aras | H04N 7/17354 348/E7.075 |
| 5,880,769 | A * | 3/1999 | Nemirofsky et al. | 725/139 |
| 5,929,849 | A * | 7/1999 | Kikinis | H04N 5/44543 348/E5.002 |
| 5,978,013 | A * | 11/1999 | Jones et al. | 725/23 |
| 6,282,713 | B1 * | 8/2001 | Kitsukawa et al. | 725/36 |
| 6,438,751 | B1 * | 8/2002 | Voyticky | H04H 60/40 725/42 |
| 6,490,725 | B2 | 12/2002 | Kikinis | |
| 7,001,279 | B1 | 2/2006 | Barber et al. | |

(Continued)

FOREIGN PATENT DOCUMENTS

| | | |
|---|---|---|
| CN | 1214837 | 4/1999 |
| CN | 101305611 | 11/2008 |

(Continued)

OTHER PUBLICATIONS

The EP Search Report mailed Mar. 14, 2011 for PCT Application No. PCT/US10/61984, a counterpart application of U.S. Appl. No. 12/683,737.

(Continued)

*Primary Examiner* — Randy Flynn
*Assistant Examiner* — Reuben M Brown
(74) *Attorney, Agent, or Firm* — Lee & Hayes, PLLC

(57) ABSTRACT

Techniques described herein identify items within a content stream and output information pertaining to these items. For instance, the techniques may monitor an audio and/or video stream to identify products, geographical locations, particular people, or any other item of interest. In response to identifying an item of interest, the techniques obtain an instruction that determines what type of information to output with the content stream.

31 Claims, 8 Drawing Sheets

(56) References Cited

U.S. PATENT DOCUMENTS

| | | | |
|---|---|---|---|
| 7,058,963 B2* | 6/2006 | Kendall | H04H 20/14 386/249 |
| 7,150,028 B1* | 12/2006 | Ranta | 725/23 |
| 7,158,676 B1 | 1/2007 | Rainsford | |
| 7,231,651 B2 | 6/2007 | Pong | |
| 7,237,252 B2 | 6/2007 | Billmaier | |
| 7,269,837 B1* | 9/2007 | Redling | G06Q 30/02 348/E5.006 |
| 7,346,917 B2 | 3/2008 | Gatto et al. | |
| 7,383,209 B2* | 6/2008 | Hudetz | G06F 17/30879 235/462.01 |
| 7,577,979 B2* | 8/2009 | Feinleib et al. | 725/114 |
| 7,793,316 B2* | 9/2010 | Mears et al. | 725/9 |
| 7,856,644 B2* | 12/2010 | Nicholson et al. | 725/32 |
| 8,068,781 B2* | 11/2011 | Ilan et al. | 455/3.01 |
| 8,160,840 B2* | 4/2012 | Caruso | G06F 17/30743 341/155 |
| 8,213,916 B1 | 7/2012 | Yankovich et al. | |
| 8,601,504 B2* | 12/2013 | Stone et al. | 725/19 |
| 9,071,730 B2* | 6/2015 | Livesey | H04N 7/17318 |
| 2001/0021916 A1 | 9/2001 | Takai | |
| 2001/0023436 A1* | 9/2001 | Srinivasan et al. | 709/219 |
| 2001/0052133 A1 | 12/2001 | Pack et al. | |
| 2001/0056350 A1 | 12/2001 | Calderone et al. | |
| 2002/0056091 A1 | 5/2002 | Bala et al. | |
| 2002/0104090 A1 | 8/2002 | Stettner | |
| 2002/0120934 A1 | 8/2002 | Abrahams | |
| 2002/0120935 A1 | 8/2002 | Huber et al. | |
| 2002/0174444 A1 | 11/2002 | Gatto et al. | |
| 2003/0101104 A1 | 5/2003 | Dimitrova et al. | |
| 2003/0182658 A1 | 9/2003 | Alexander | |
| 2004/0117839 A1 | 6/2004 | Watson et al. | |
| 2004/0125125 A1* | 7/2004 | Levy | H04N 21/8352 715/716 |
| 2004/0249726 A1 | 12/2004 | Linehan | |
| 2006/0064757 A1 | 3/2006 | Poslinski | |
| 2006/0150218 A1* | 7/2006 | Lazar et al. | 725/60 |
| 2006/0273893 A1 | 12/2006 | Warner | |
| 2007/0030385 A1* | 2/2007 | Crawford | B60R 11/0235 348/468 |
| 2007/0039020 A1* | 2/2007 | Cansler et al. | 725/37 |
| 2007/0061845 A1 | 3/2007 | Barnes | |
| 2007/0079335 A1 | 4/2007 | McDonough | |
| 2007/0124769 A1 | 5/2007 | Casey et al. | |
| 2007/0150360 A1* | 6/2007 | Getz | 705/26 |
| 2008/0021786 A1* | 1/2008 | Stenberg | G06Q 30/0239 705/14.39 |
| 2008/0052226 A1 | 2/2008 | Agarwal et al. | |
| 2008/0098425 A1 | 4/2008 | Welch | |
| 2008/0109841 A1 | 5/2008 | Heather et al. | |
| 2008/0155637 A1 | 6/2008 | Du Breuil | |
| 2008/0255961 A1 | 10/2008 | Livesey | |
| 2008/0281689 A1* | 11/2008 | Blinnikka | G06Q 30/02 705/14.61 |
| 2008/0304747 A1* | 12/2008 | Marinkovich et al. | 382/183 |
| 2008/0319852 A1* | 12/2008 | Gardner | G06Q 30/02 705/14.4 |
| 2009/0077459 A1 | 3/2009 | Morris et al. | |
| 2009/0123025 A1* | 5/2009 | Deng | G06K 9/00711 382/100 |
| 2009/0125559 A1* | 5/2009 | Yoshino | 707/104.1 |
| 2009/0150330 A1 | 6/2009 | Gobeyn et al. | |
| 2009/0193463 A1* | 7/2009 | Choi et al. | 725/40 |
| 2009/0276805 A1 | 11/2009 | Andrews, II et al. | |
| 2010/0060802 A1 | 3/2010 | Huegel | |
| 2010/0175080 A1 | 7/2010 | Yuen et al. | |
| 2011/0078001 A1* | 3/2011 | Archer et al. | 705/14.2 |
| 2011/0093884 A1* | 4/2011 | Wachtfogel et al. | 725/31 |
| 2011/0135283 A1* | 6/2011 | Poniatowki et al. | 386/297 |
| 2011/0167456 A1 | 7/2011 | Kokenos et al. | |
| 2011/0225604 A1* | 9/2011 | Bova | 725/23 |
| 2011/0289535 A1 | 11/2011 | Saffari et al. | |
| 2012/0066708 A1 | 3/2012 | Lee et al. | |
| 2012/0167145 A1 | 6/2012 | Incorvia | |
| 2014/0109118 A1 | 4/2014 | Kokenos et al. | |
| 2014/0282674 A1* | 9/2014 | Conradt et al. | 725/19 |

FOREIGN PATENT DOCUMENTS

| | | |
|---|---|---|
| CN | 101529770 | 9/2009 |
| EP | 0672993 | 9/1995 |
| JP | 2002108668 | 4/2002 |
| JP | 2005503598 | 2/2005 |
| JP | 2006031200 | 2/2006 |
| JP | 2008271196 | 11/2008 |
| WO | WO2011044270 | 4/2011 |

OTHER PUBLICATIONS

U.S. Appl. No. 12/683,737, filed on Jan. 7, 2010, Kokenos, et al., "Offering Items Identified in a Media Stream".

Ad-ID Advertising Identification and Management, Advertising Digital Identification, LLC, Copyright 2002-2003, retrieved on Feb. 24, 2010 at <<https://www.ad-id.org/>> and <<https://www.ad-id.org/help/help_detailNEW.cfm>>, 2 pgs.

Google Googles Labs, Retrieved on Feb. 24, 2010 at <<http://www.google.com/mobile/goggles/#landmark>>, 1 pg.

OpenCable, CableLabs, Retrieved on Feb. 24, 2010 at <<http://www.cablelabs.com/opencable/>>, 1 pg.

The Extended European Search Report mailed Jul. 9, 2013 for European patent application No. 10842750.1, 6 pages.

Office Action for U.S. Appl. No. 12/683,737, mailed on Apr. 22, 2013, Kokenos et al., "Offering Items Identified in a Media Stream", 18 pages.

Translated Japanese Office Action mailed Dec. 2, 2014 for Japanese patent application No. 2012-548037, a counterpart foreign application of U.S. Appl. No. 12/683,737, 7 pages.

The Chinese Office Action mailed Apr. 3, 2015 for Chinese patent application No. 201080065280.4, a counterpart foreign application of U.S. Appl. No. 12/683,737, 18 pages.

The European Office Action mailed Mar. 11, 2015 for European patent application No. 10842750.1, a counterpart foreign application of U.S. Appl. No. 12/683,737, 5 pages.

Office action for U.S. Appl. No. 14/098,241, mailed on Apr. 29, 2016, Kokenos et al., "Offering Items Identified in a Media Stream", 19 pages.

Translated Chinese Office Action mailed Nov. 26, 2015 for CN patent application No. 2010800652803.4, a counterpart foreign application of U.S. Pat. No. 8,627,379, 7 pages.

The Summons to Attend Oral Proceedings mailed Feb. 8, 2016 for European patent application No. 10842750.1, a counterpart foreign application of U.S. Pat. No. 8,627,379, 5 pages.

Translated Japanese Notice of Allowance mailed Mar. 29, 2016 for Japanese Patent Application No. 2012-548037, a counterpart foreign application of U.S. Pat. No. 8,627,379, 6 pages.

Office action for U.S. Appl. No. 12/683,737, mailed on Sep. 14, 2012, Kokenos et al., "Offering Items Identified in a Media Stream", 18 pages.

Office action for U.S. Appl. No. 14/098,241, mailed on Sep. 17, 2015, Kokenos et al., "Offering Items Identified in a Media Stream", 15 pages.

The Canadian Office Action mailed Nov. 16, 2015 for Canadian Patent Application No. 2786587, a counterpart foreign application of U.S. Pat. No. 8,627,379, 4 pages.

Translated Japanese Office Action mailed Jul. 28, 2015 for Japanese patent application No. 2012-548037, a counterpart foreign application of U.S. Appl. No. 12/683,737, 6 pages.

* cited by examiner

IDENTIFYING ITEMS IN A CONTENT STREAM

RELATED APPLICATIONS

This application is related to U.S. patent application Ser. No. 12/683,737, filed on Jan. 7, 2010 and entitled OFFERING ITEMS IDENTIFIED IN A MEDIA STREAM, which is incorporated herein by reference in its entirety.

BACKGROUND

While consuming a content stream, users may view or hear scores of advertisements or other pieces of content relating to an array of different items. For instance, a user watching a video stream, such as broadcast television, may view an advertisement for a particular product that he or she may wish to obtain (e.g., purchase) or learn more about. However, in order to obtain or learn more information about the product, the user must typically either go to a brick-and-mortar store that offers the desired product or use a computer to locate information about the product or a merchant that offers the product. However, both of these two options require the user to direct his or her attention away from the object currently of interest—namely the video stream that is currently being broadcast and consumed by the user in this example.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
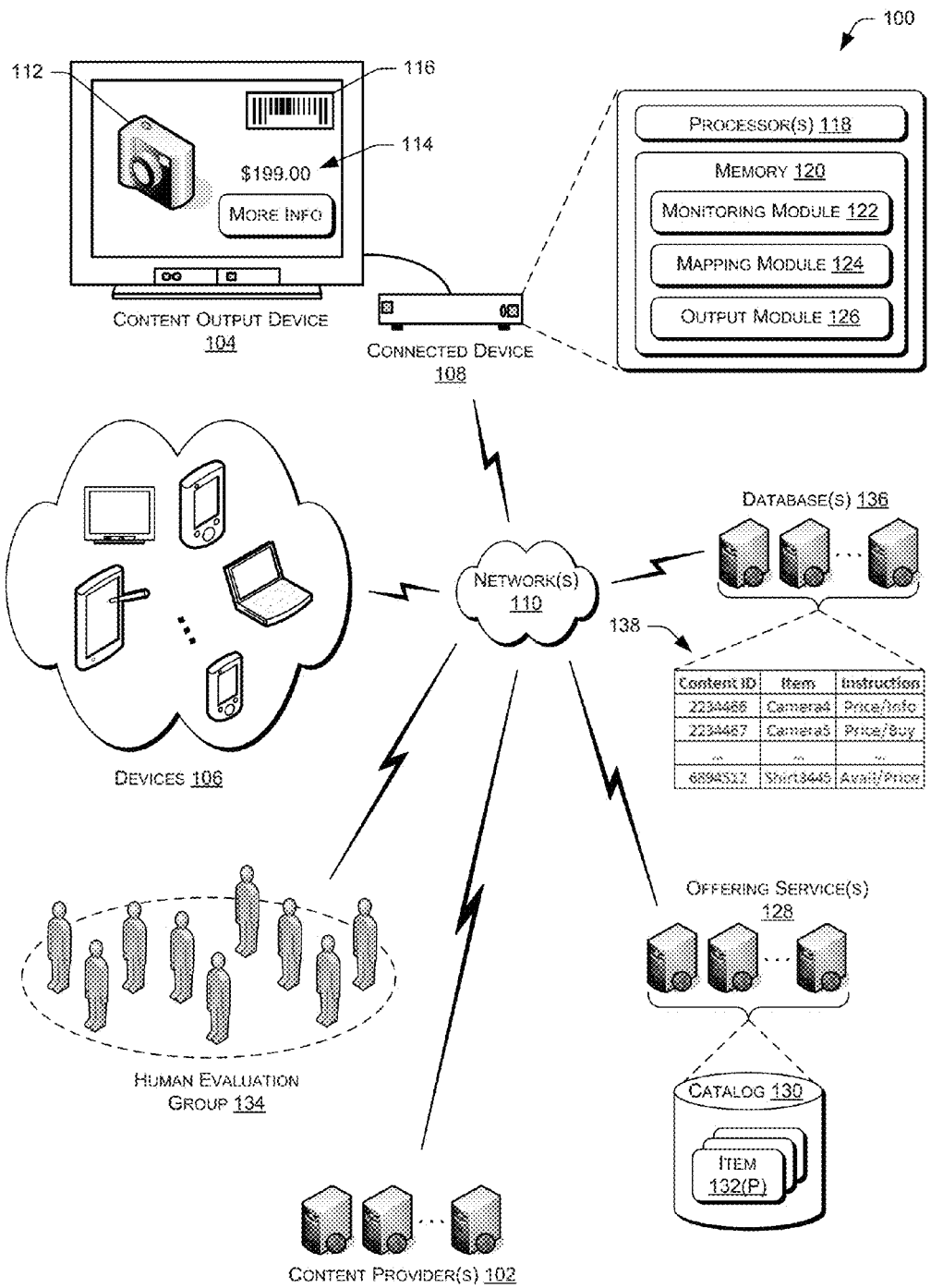
FIG. 1 illustrates an example architecture that includes a content provider that provides a content stream to a device connected to a content output device. The connected device outputs the stream to the content output device and monitors the stream for items within the stream. For instance, the connected device may attempt to locate a content identifier (ID) associated with an item and, in response, may output information pertaining to the item.

This disclosure is directed, in part, to techniques to identify items within a content stream and output information pertaining to these items. In some instances, this information may be output with the content stream. For instance, the techniques may monitor an audio and/or video stream to identify products, geographical locations, particular people, or any other item of interest. In response to identifying an item of interest, the techniques obtain an instruction that determines what type of information to output with the content stream.

With these techniques, in one example a video stream being displayed on an output device (e.g., a television, a laptop computer, etc.) may include an advertisement for an item offered for acquisition (e.g., purchase, rent, lease, etc.). A device connected to the output device may monitor the output video stream to identify this advertisement and/or an item associated with this advertisement. In one example, a content provider that provides the content stream may have embedded a content identifier (ID) within the content stream corresponding to the advertisement. For instance, the content provider may have embedded a barcode or a universal product code (UPC) associated with the advertised item within the portion of the content stream corresponding to the advertisement.

The device that monitors the video stream may identify this barcode or UPC and, in response, may access a database mapping this barcode or UPC to the corresponding item and potentially to an instruction. The instruction may direct the device to take a certain action in response to locating this particular item. For instance, the instruction may direct the device to determine a current price or availability of the item and to display this price or availability over the content stream. The instruction may also instruct the device to display a selectable icon over the content stream that, when selected, allows the user to obtain more information about the item or that allows the user to purchase the item from an offering service that offers the item. In this regard, the connected device may implement the techniques described in U.S. patent application Ser. No. 12/683,737, incorporated by reference in its entirety above.

In response to mapping the content ID to an item and an instruction, the connected device may obtain the information according to the instruction. For instance, the connected device may request a current price or availability for the item from an offering service that offers the item. After receiving this information, the connected device may then display this price or availability along with a selectable icon to obtain the item or additional information about the item. Therefore, when a user views the video stream and the described advertisement is displayed, the user also views the current price or availability of the advertised item and an icon that, when selected, initiates acquisition of the item or provides the user with additional information regarding the item.

In some instances, the content provider does not explicitly embed a content ID into the content stream. In these instances, the connected device may identify the content (and any items associated with the content) using other recognition techniques. For instance, the device or another entity may continually or periodically analyze frames of the content stream to identify a unique audio and/or visual fingerprint associated with the content. Once the device or another entity identifies a unique fingerprint, the device or the other entity may access the database discussed above that maps this identified piece of content (e.g., an advertisement, etc.) to a particular item and an instruction. Also as described above, the connected device may then display or otherwise output the information pertaining to the item in accordance with the instruction.

In still other instances, the connected device may provide one or more frames of the content stream to a human evaluation group for identifying any items therein. Each user of the human evaluation group may provide his or her input as to the identity of any items within the content stream. The connected device or another entity may then use these identifications to make a determination of any items within the content stream. Again, the connected device may then map these item(s) to an instruction directing the device to output certain information with the content stream.

In still other instances, users that consume the content stream (e.g., users watching a video stream) may provide identifications of items within the content stream, either as they consume the stream or as feedback to information presented on the content stream by the connected device. Again, the connected device may use this information in future instances of identifying items within the content stream.

The techniques described above and below may be implemented in a number of ways and in a number of contexts. Several example implementations and contexts are provided with reference to the following figures, as described below in more detail. However, the following implementations and contexts are but a few of many. For instance, and as discussed above, these techniques apply to a variety of content output devices and for a variety of content streams, including audio streams, video streams and any other form of content stream.

Illustrative Architecture

FIG. 1 illustrates an example architecture 100 in which a content provider 102 provides a content stream (e.g., a television broadcast stream, a radio stream, etc.) to a content output device 104 and potentially an array of other devices 106. In this example, the content provider 102 provides a video stream that is received by a device 108 connected to the content output device 104, such as a set-top box. As illustrated, the content provider 102 provides the displayed video stream over a network 110, which may include any one or combination of multiple different types of networks, such as cable networks, the Internet, and wireless networks. In some instances, network 110 comprises a cable network, a satellite network, an over-air broadcast network, or any other network that provides a television broadcast signal, an audio stream, video-on-demand or any other video or audio signal.

Content provider 102 may comprise a cable television provider, a satellite television provider, a satellite radio provider, or any other type of provider capable of producing, creating, and/or providing a content stream to a content output device 104. In the illustrated example, connected device 108 monitors the content stream to detect when items are displayed on the content output device 104, as introduced above and described in detail below. Although illustrated as separate from the content output device 104, the connected device 108 may be integral with the content output device 104 in other implementations. Furthermore, the connected device 108 may comprise a set-top box, a game console, a media center or any other computing device that receives the content stream that is displayed or otherwise output on the content output device 104.

Generally, the connected device 108 monitors the content stream being output on the content output device 104 to identify items within the stream. In response, the connected device 108 displays or otherwise outputs information pertaining to these items on the content output device 104. In the illustrated example, the connected device 108 identifies that the content stream includes an item 112 comprising a digital camera. In response, the connected device 108 displays information 114 pertaining to the item. Here, this information 114 includes a current price of the camera at a particular merchant, as well as a selectable icon that in this example allows a user to receive more information regarding the illustrated camera.

In this example, the content stream being monitored by the connected device 108 and being output by the content output device 104 includes a content identifier (ID) 116. Here, the content ID comprises a barcode that identifies the illustrated item 112. In other instances, the content ID may comprise a universal product code (UPC) or any other unique identifier associated with the item 112. In still other instances, the content ID may comprise a unique trace or fingerprint of the audio and/or visual portions of the content stream. This unique trace or fingerprint may comprise a series of sound, colors and/or the like that is unique to a particular portion of content, such as an advertisement or the like.

As illustrated, the connected device 108 includes one or more processors 118 and memory 120, which stores a monitoring module 122, a mapping module 124, and an output module 126. While FIG. 1 illustrates these modules on the connected device 108 itself, some or all of this functionality may be employed remotely and by other entities.

The monitoring module 122 functions to monitor the content stream provided by the content provider 102 and output by the content output device 104. The monitoring module 122 may continuously monitor this stream in order to attempt to locate a content ID, or the monitoring module 122 may periodically monitor this stream. For instance, the module 122 may periodically take screenshots of a video stream in order to analyze these screenshots for the presence of one or more content IDs.

In some instances, the content provider 102 inserts the content IDs into the content stream. Here, the content provider 102 may insert these IDs in a consistent and pre-specified area of the stream (e.g., in a top-right corner of the frames of the screen). Here, the monitoring module 122 may be configured to monitor this particular area of the stream.

The mapping module 124, meanwhile, functions to map an identified content ID to one or more particular items, as well as to one or more instructions that direct the connected device 108 to output certain types of information. In some instances, the mapping module 124 provides a located content ID to an offering service 128. As illustrated, the offering service 128 includes an electronic catalog 130 of one or more digital and/or physical items 132(1), 132(2), . . . , 132(P). The offering service 128 may offer some or all of these items 132(1)-(P) for acquisition (e.g., purchase, download, etc.).

When the offering service 128 receives a content ID from the mapping module 124, the offering service 128 may attempt to determine the item associated with the ID (e.g., the barcode, the UPC, etc.). If successful, the offering service 128 may return the identification of this item to the mapping module 124 of the connected device 108.

In instances where the content provider 102 has not inserted a barcode, UPC or the like into the content stream, the monitoring module 122 may send a portion (e.g., a frame) of the content stream to the offering service 128. If the offering service 128 is unable to identify an item within the received portion of the content stream (e.g., with reference to a unique fingerprint of the content), the offering service may provide this portion of the stream to a human evaluation group 134. One or more users of the human evaluation group 134 may analyze this portion of the stream to identify one or more items therein. The offering service may receive the responses of this group and may provide, to the monitoring module 122, the identity of an item most consistently identified by the group 134.

After receiving an identity of an item from the offering service 128, or in lieu of sending the content ID to the offering service 128 at all, the mapping module 124 accesses a database 136 to determine (1) an identity of an item referenced by a content ID (if not already received), and (2) an instruction. As illustrated, the database 136 includes a table 138 that maps content IDs to items and instructions. For instance, the table 138 may map a particular barcode number ("2234466") to a particular item ("camera4," the illustrated camera in this example) and an instruction ("Price/Info"). The instruction directs the connected device 108 to output certain types of information based on the item.

In the illustrated example, for instance, the table 138 directs the connected device to determine and output a price of the camera, as well as an icon that allows a user to receive more information regarding the camera. The instruction may additionally or alternatively instruct the connected device to output a specifications of the item, availability of the item, options associated with item (e.g., colors, sizes, etc.), an option to acquire the item, or any other information pertaining to the item. The table may also instruct the connected device 108 to output an icon that allows the user to obtain the item, to add the item to a cart of the user, or the like.

In the instant example, the mapping module 124 maps the content ID to the camera and an instruction directing the connected device 108 to output a current price of the camera and an icon to allow the user to receive more information regarding the camera. In response, the mapping module 124 queries the offering service 128 for a current price of the camera.

After determining the item within the content stream and the information pertaining to the item, the output module 126 outputs this information with the content stream. For instance, the output module 126 may cause display of this information on the content output device 104. Here, for instance, the output module 126 causes display of the current price of the illustrated camera ($199) and an icon that, when selected, allows a user to receive more information regarding the camera from the manufacturer of the camera, an offering service (e.g., a merchant) that offers the camera, or the like.

By monitoring the content stream output by the content output device 104, the connected device 108 is able to provide information pertaining to items within the content stream on a real-time basis. For instance, while a user views broadcast television, the user may also view information pertaining to items advertised or otherwise displayed within the stream. The user may also potentially learn more information about the item or request to obtain the item, depending upon the icons displayed by the connected device 108.

Illustrative Flow Diagrams and User Interfaces

Figure 2:
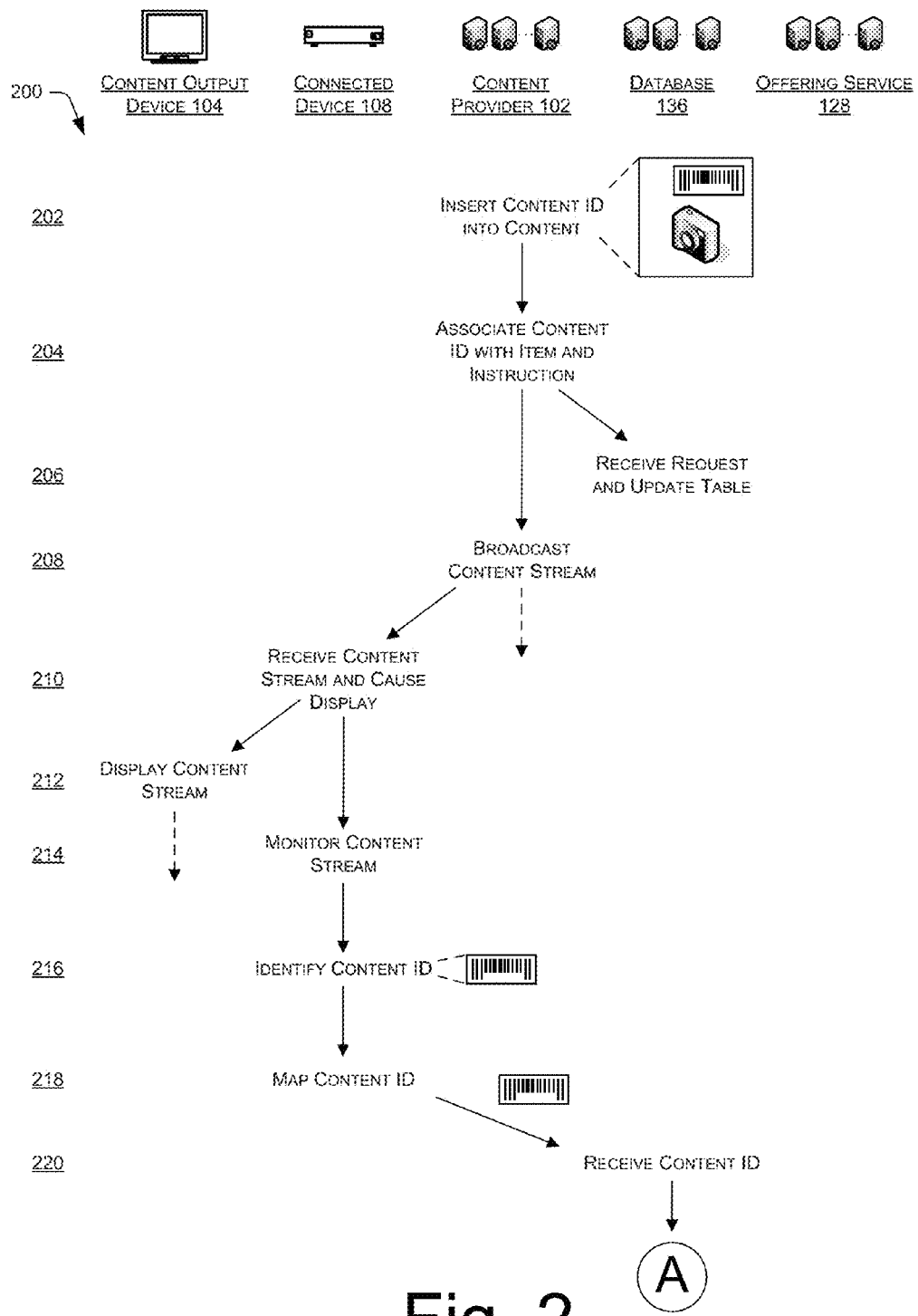
FIGS. 2-3 illustrate an example flow diagram of a process for monitoring a content stream for a content ID and, in response to locating a content ID, outputting information pertaining to an item associated with the content ID. Here, the located content ID is embedded within the content stream.
Figure 3:
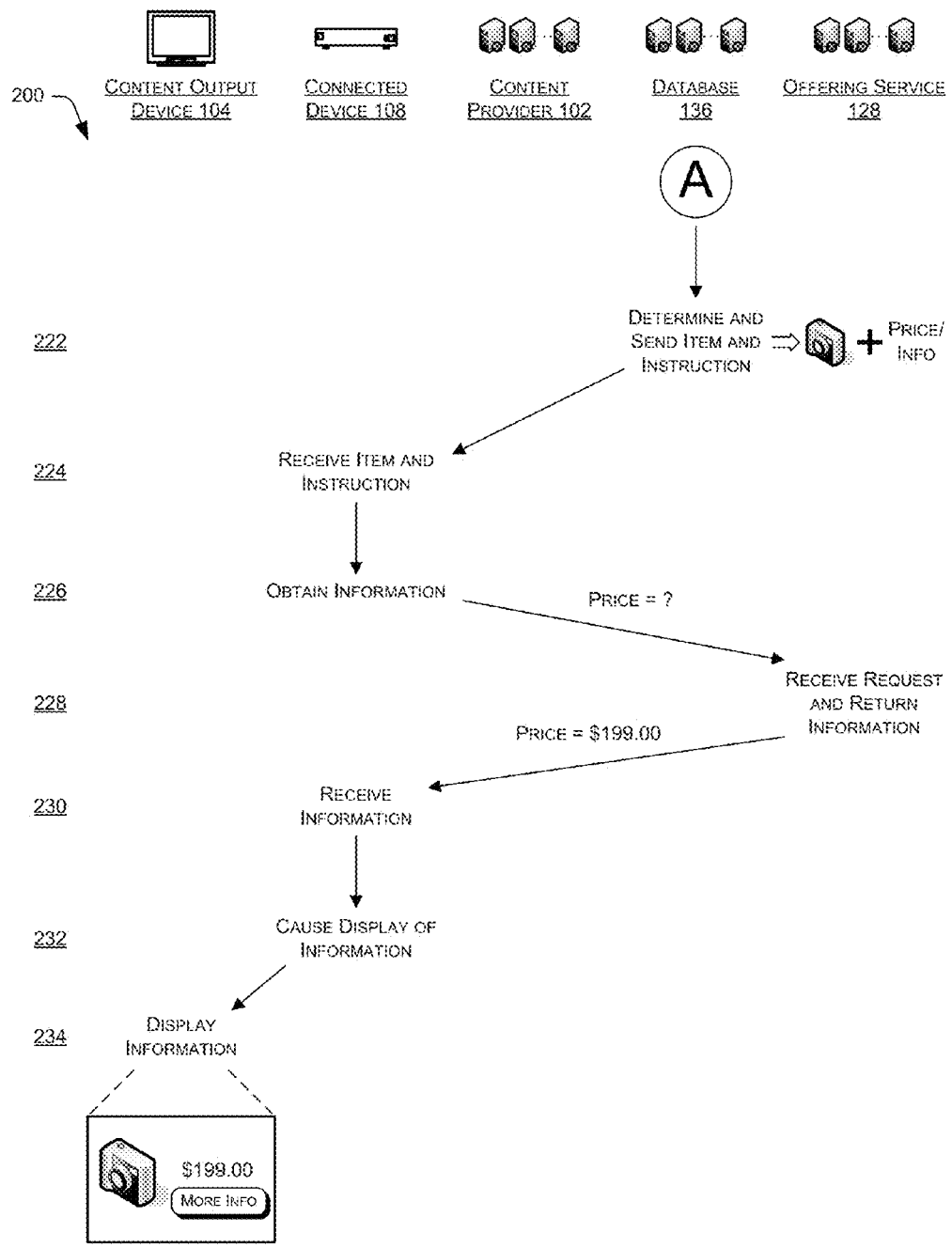

FIGS. 2-3 illustrate an example flow diagram of a process 200 for monitoring a content stream for a content identifier (ID) and, in response to locating a content ID, outputting information pertaining to an item associated with the content ID. Here, the located content ID is embedded within the content stream.

The process 200 is illustrated as a collection of acts, each individually performed by a particular actor described above with reference to FIG. 1. However, these acts may be performed in other manners and by other entities in different examples.

The process 200 includes, at 202, the content provider 102 inserting a content ID into a content stream. This may include, for instance, embedding a barcode, a universal product code (UPC), or the like into the content. When embedding a content ID into a visual portion of the content stream, the provider 102 may embed this content ID into the portion of the content stream that is viewable to a user or in the portion that is outside the viewable region of the content.

Figure 4:
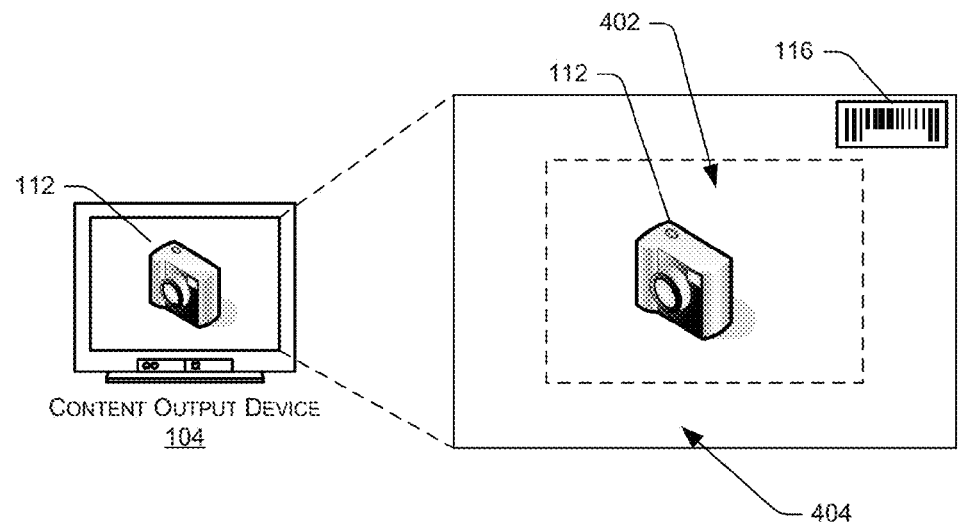
FIG. 4 illustrates an example portion (e.g., a single frame) of the content stream being output by the content output device of FIG. 1, a portion of which may be displayed on the content output device. This figure illustrates that the content may include a content ID in an area of the content stream that is outside a viewable area of the content output device.

FIG. 4, for instance, illustrates an example portion (e.g., a single frame) of the content stream being output by the content output device 104, with this portion including the embedded content ID. Here, this portion of the content stream includes a portion 402 that is within the viewable area of the content output device, as well as a portion 404 that is outside this viewable area. Here, the content provider 102 has inserted the content ID 116 into the portion 404 that is outside the viewable area 402. As such, the connected device 108 is able to identify this content ID associated with the illustrated item 112 without the user ever seeing the content ID.

Figure 5:
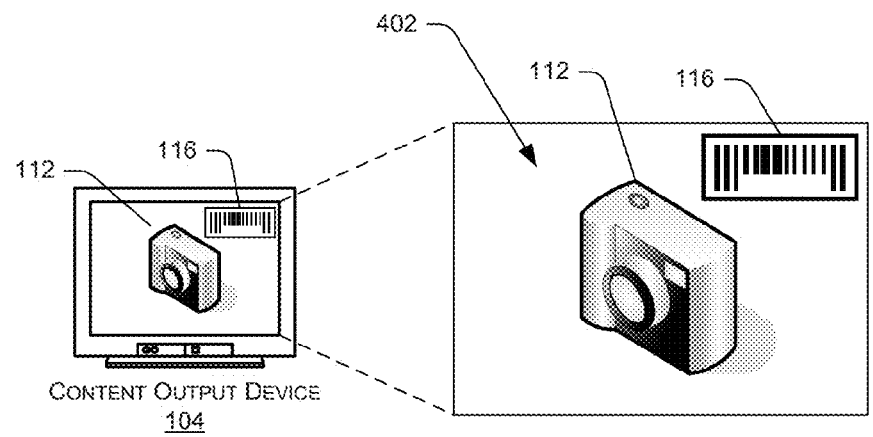
FIG. 5 illustrates another example portion (e.g., a single frame) of the content stream being output by the content output device of FIG. 1. Here, the content includes a content ID in an area of the content stream that is within a viewable area of the content output device.

Conversely, FIG. 5 illustrates that the content provider 102 may embed the content ID 116 within the portion 402 of the content stream that is within the viewable area of the content output device. In the these instances, the content ID may be so small or may reside on so few frames so as to be imperceptible to a human user.

Returning to FIG. 2, at 204, the content provider associates the embedded content ID with an associated item and with a particular instruction. As discussed above, this instruction may direct a connected device to output certain information, such as details regarding the item or icons that are selectable by users to perform actions relating to these items (e.g., obtain the item, obtain information regarding the item, etc.). At 206, the database 136 storing the table 138 receives the request and updates the table 138 to reflect the association between the content ID and the item (e.g., the camera) and the received instruction.

At 208, the content provider 102 provides the content stream to a collection of devices. For instance, the content provider 102 may broadcast a live stream of content to these devices. The dotted line indicates that the content provider 102 may continue to broadcast the content stream during the process 200. At 210, the connected device 108 receives the content stream and causes display of the content on the content output device 104. At 212, the content output device displays the content. At 214, the connected device 108 monitors the content stream for the purpose of identifying items therein. While the process 200 illustrates that the connected device 108 begins monitoring the stream after causing display of the stream, the device 108 may begin monitoring the stream prior to causing display or simultaneous to causing display of this stream.

At 216, the connected device 108 identifies a content ID, such as a barcode, a UPC, or the like. In this example, the device 108 has identified the content ID associated with the digital camera currently displayed on the content output device 104. At 218, the connected device 108 maps the identified content ID to an item and an instruction. This may include providing the content ID to the database 136 to determine the item and instruction. At 220, the database 136 receives the content ID.

FIG. 3 continues the illustration of the process 200 and includes, at 222, the database 136 determining the item and instruction and sending this data to the connected device 108. Here, the determined item comprises the digital camera, while the instruction directs the connected device 108 to obtain and display a price of the camera at the offering service 128, as well as an icon to allow a user to receive more information about the item. At 224, the connected device 108 receives the item and the instruction. At 226, the connected device 108 begins obtaining the information specified by the instruction, such as the price of the camera in the illustrated example.

To do so, the connected device 108 sends a request for a price to an offering service 128 that offers the particular item (potentially identified with the received instruction, originally registered by the content provider 102 at 204). At 228, the offering service 128 receives the request and returns the information. Here, the offering service 128 returns the price of the digital camera ($199). At 230, the connected device 108 receives this information and, at 232, causes display of this information and the icon to allow a user to receive additional information about the camera.

At 234, the content output device 104 displays the information, which here comprises the price and the selectable icon. At this point, the process may implement techniques described in U.S. patent application Ser. No. 12/683,737, incorporated by reference in its entirety above.

Figure 6:
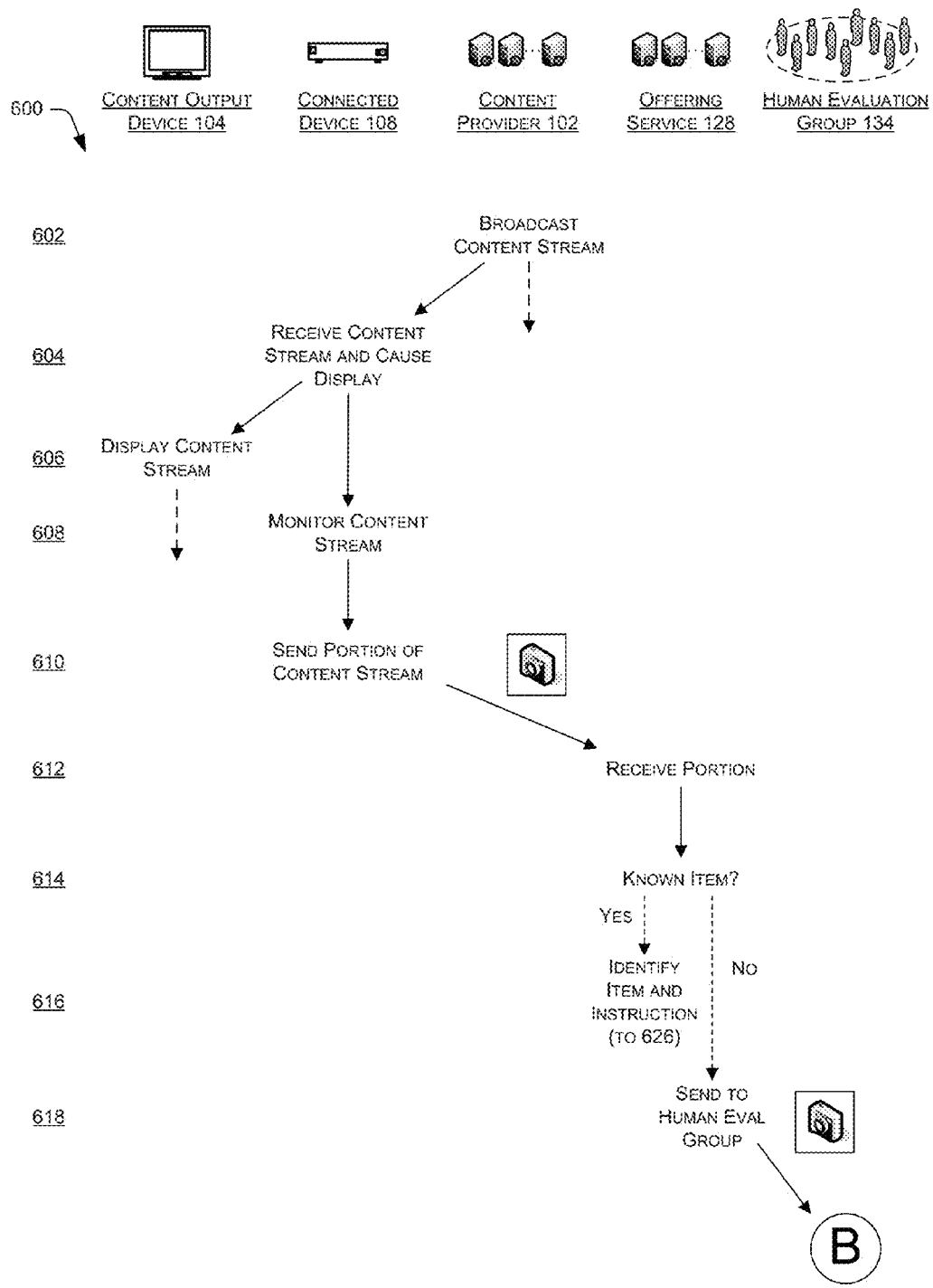
FIGS. 6-7 illustrate an example flow diagram of a process for monitoring a content stream to identify content and, in response, outputting information pertaining to an item associated with the identified content. Here, an offering service or a group of human evaluation users identify the content.
Figure 7:
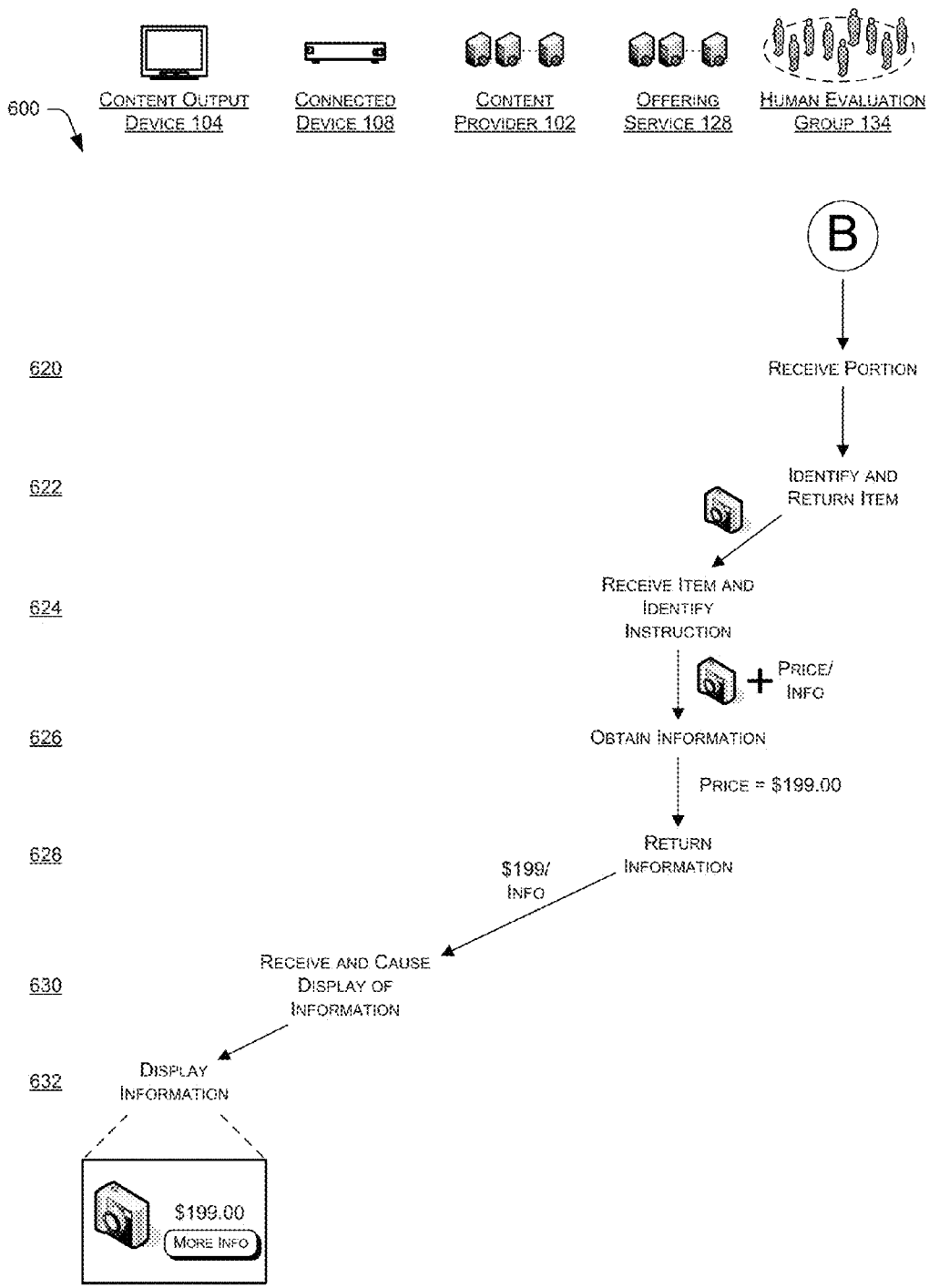

FIGS. 6-7 illustrate an example flow diagram of a process 600 for monitoring a content stream to identify content and, in response, outputting information pertaining to an item associated with the identified content. Here, an offering service or a group of human evaluation users identify the content.

The process 600 includes the content provider 102 broadcasting the content stream at 602. At 604, the connected device 108 receives the content stream and causes display of the content stream on the content output device 104. At 606, the content output device 104 outputs the content (here, a video stream). At 608, the connected device 108 monitors the content stream. In this instance, this may include taking screenshots of the content stream and sending these screenshots to the offering service 128 or to another entity for analysis. In some instances, a user consuming the stream may provide an instruction that triggers the sending of the screenshots. At 610, the connected device 108 sends a portion (e.g., one or more screenshots or frames) to the offering service 128.

At 612, the offering service 128 receives the portion of the content stream and, at 614, the offering service queries as to whether the portion of the content stream includes a known item. For instance, the offering service 128 may determine whether the offering service 128 has previously associated the received portion of the content stream with an item from the electronic catalog 130. The offering service 128 may make this determination by identifying a unique trace or fingerprint (audio and/or visual) and comparing this unique fingerprint to a database of known fingerprints.

If the offering service 128 determines that the portion of the content does contain a known item, then the offering service identifies the item and the associated instruction at 616. The process 600 then proceeds to 632. If, however, the offering service 128 does not recognize the received portion of content, then the offering service 128 may send the portion of the content stream to the human evaluation group 134 at 618.

FIG. 7 continues the illustration of the process 600 and includes, at 620, the human evaluation group 134 receiving the portion of the content stream. At 622, the human evaluation group 134 collectively identifies one or more items within the content stream and sends the identification of the item back to the offering service 128. At 624, the offering service 128 receives this identification and determines an instruction associated with the identified one or more items. At 626, the offering service 128 obtains the information associated with the instruction (e.g., the price of the camera) and, at 628, returns the information to the connected device 108. At 630, the connected device 108 receives this information and causes display of the information on the content output device 104. At 632, the content output device 104 displays the information. In this example, the content output device again displays the price of the camera and a selectable icon to allow a viewing user to obtain additional information regarding the camera.

Illustrative Processes

Figure 8:
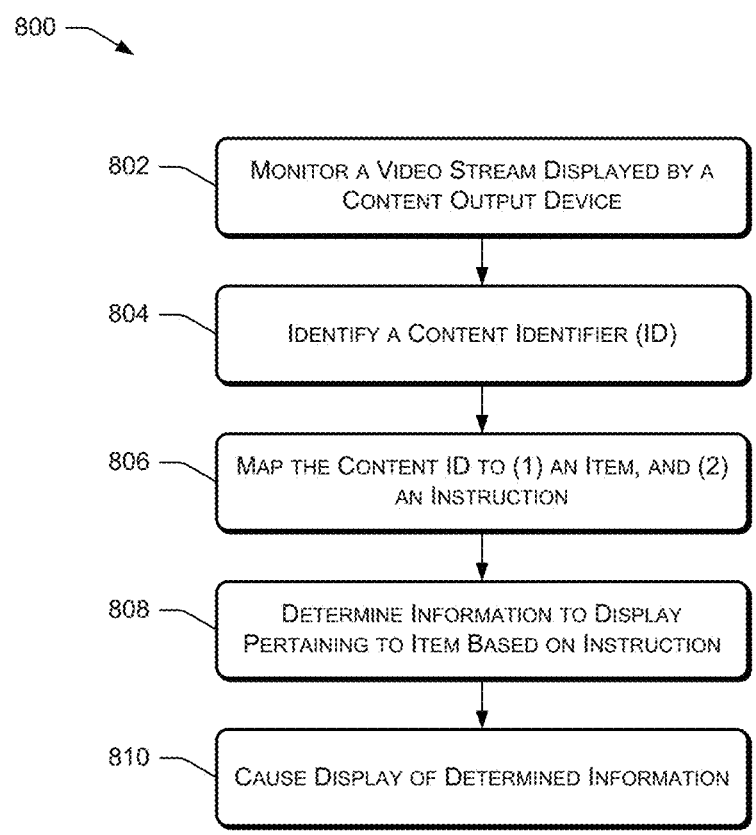
FIG. 8 illustrates an example process that the connected device of FIG. 1 may implement for identifying a content ID within a video stream and, in response, outputting information associated with a corresponding item.
Figure 9:
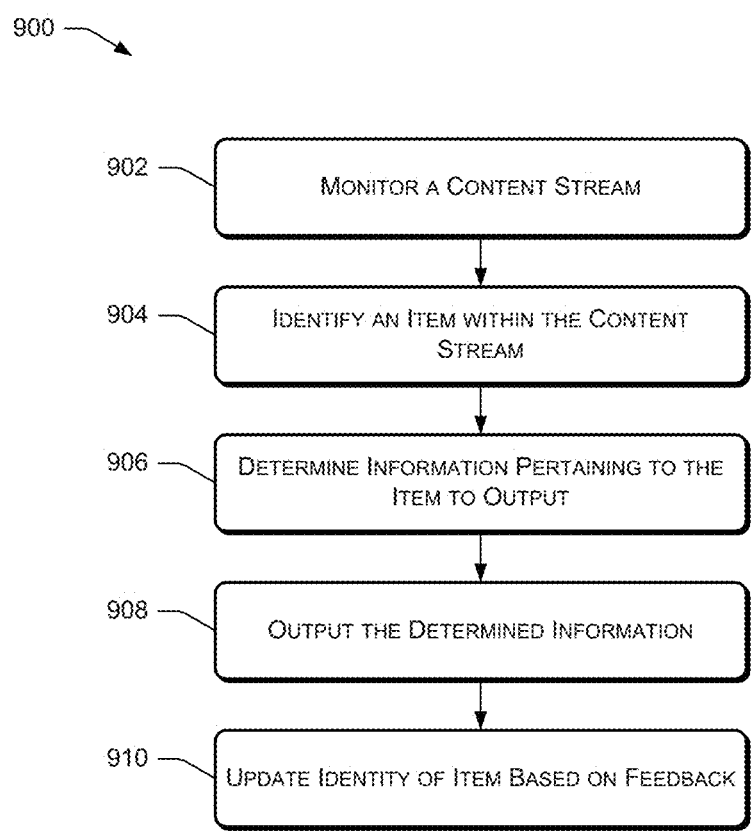
FIG. 9 illustrates an example process for monitoring a content stream to identify content and, in response, outputting information pertaining to a corresponding item.

FIGS. 8-9 illustrate example processes 800 and 900 for implementing the techniques described above. While these processes are described with reference to the architecture discussed above, the described techniques may be equally applicable in many other architectures and environments. Furthermore, the described processes can be implemented in hardware, software, or a combination thereof. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

The process 800 includes monitoring, at operation 802, a video stream being output by a content output device, such as a television, a laptop computer, a personal computing device, a personal media player, a portable digital assistant, an electronic book reader device, or any other type of device. Operation 804 represents identifying a content identifier (ID) within the video stream. For instance, the connected device 108 may identify a barcode, a UPC, or may identify a unique fingerprint of the content.

The process 800 further includes, at operation 806, mapping this content ID to an item and an instruction. An operation 808 then determines information to display with the content stream based on the mapped instruction. The process 800 then concludes with an operation 810, which causes display of the determined information on the content output device.

FIG. 9 illustrates the process 900, which includes monitoring a content stream at operation 902. An operation 904 then identifies an item within the content stream. This operation may include, for instance, identifying a barcode, a universal product code (UPC), or the like within the stream and mapping this to an item. This may also include identifying a unique audio and/or visual fingerprint within the stream. Additionally or alternatively, this may include sending a portion of the content stream to a group of human users for identifying the item.

An operation 906 then determines information pertaining to the item to output on the content output device 104. For instance, this may include determining an instruction associated with the item (e.g., display item price, options, availability, etc.) and then querying an offering service for this information. Finally, an operation 908 displays the determined information.

In some instances, users that consume the content stream may provide feedback as to the identity of the item. For instance, operation 908 may display a selectable icon that allows users to agree or disagree with the identification of the item (e.g., "Did we correctly identify this item? Yes or No"). In response to a threshold number of users providing feedback that the item was incorrectly identified, then the identity of the item may be changed or updated at operation 910. Conversely, consistent feedback indicating that the item has been correctly identified may strengthen the confidence in the identification of the item.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. One or more non-transitory computer-readable media storing computer-executable instructions that, when executed, cause one or more processors to perform acts comprising:
   monitoring a video stream being displayed by a content output device;
   detecting a content identifier (ID) within the video stream based at least partly on the monitoring of the video stream, the content ID being associated with an item offered for acquisition that is displayed in one or more frames of the video stream, the content ID being inserted into the video stream at a location that is at least one of:
      adjacent to an image of the item,
      outside of a viewable area of a display of the content output device displaying the video stream, or
      inside of a viewable area of a display of the content output device displaying the video stream,
      wherein the content ID, having been inserted into the video stream, is imperceptible to a human viewing the content output device based on at least one of a size of the content ID or a number of frames used to display the content ID; and
   at least partly in response to the detecting of the content ID:
      mapping the content ID to the item and an instruction;
      determining information to display on the content output device pertaining to the item based at least in part on the instruction; and
      causing display of, on the content output device and with the video stream, the determined information pertaining to the item.

2. One or more non-transitory computer-readable media as recited in claim 1, wherein the content ID is also included within an audio stream being presented by the content output device, and detecting the content ID comprises taking one or more screen shots of the video stream, capturing audio associated with the one or more screen shots and analyzing each respective screenshot and associated audio for the content ID.

3. One or more non-transitory computer-readable media as recited in claim 1, wherein the content ID comprises a barcode or a universal product code (UPC) identifying the item offered for acquisition.

4. One or more non-transitory computer-readable media as recited in claim 1, wherein the content ID comprises an identifier that identifies an advertisement associated with the item offered for acquisition.

5. One or more non-transitory computer-readable media as recited in claim 1, wherein the video stream being displayed by the content output device comprises a live video stream.

6. One or more non-transitory computer-readable media as recited in claim 1, wherein the video stream being displayed by the content output device comprises a television broadcast signal.

7. One or more non-transitory computer-readable media as recited in claim 6, wherein the content output device comprises a television and the monitoring is performed by a set-top box coupled to the television.

8. One or more non-transitory computer-readable media as recited in claim 1, wherein the content output device comprises a laptop computer, a personal computing device, a tablet computer, a personal media player, a cellular telephone, a portable electronic device, or an electronic book (eBook) reader device.

9. One or more non-transitory computer-readable media as recited in claim 1, wherein the content ID is identified within an advertisement that forms a portion of the video stream, and wherein the item offered for acquisition comprises a digital item or a physical item offered for purchase during the advertisement.

10. One or more non-transitory computer-readable media as recited in claim 1, wherein the determined information pertaining to the item comprises a cost of the item or an availability of the item.

11. One or more non-transitory computer-readable media as recited in claim 1, wherein the determined information pertaining to the item comprises an overlay allowing a user viewing the video stream to request more information about the item.

12. One or more non-transitory computer-readable media as recited in claim 1, wherein the instruction comprises an instruction to cause display of a price or an availability of the item, and wherein the determined information pertaining to the item comprises the cost or the availability of the item.

13. One or more non-transitory computer-readable media as recited in claim 1, wherein the one or more computer-readable media reside within the content output device, within a device that is integral with the content output device, within a device that is not integral with the content output device, or a combination thereof.

14. A method comprising:
   under control of one or more computer systems configured with executable instructions,
   monitoring a content stream being provided to a content output device for output by the content output device;
   detecting a content identifier (ID) within the content stream based at least partly on the monitoring of the content stream, the content ID being associated with an item offered for acquisition that is displayed in one or more frames of the content stream, the content ID being inserted into the content stream at a location that is at least one of:
  adjacent to an image of the item,
  outside of a viewable area of a display of the content output device displaying the content stream, or
  inside of a viewable area of a display of the content output device displaying the content stream,
  wherein the content ID, having been inserted into the video stream, is imperceptible to a human viewing the content output device based on at least one of a size of the content ID or a number of frames used to display the content ID; and
at least partly in response to the detecting of the content ID:
  identifying the item;
  determining information pertaining to the item; and
  outputting the determined information to the content output device.

15. A method as recited in claim 14, wherein the content identifier comprises a barcode, a universal product code (UPC), or a unique visual or audio fingerprint.

16. A method as recited in claim 14, wherein the monitoring of the content stream further comprises sending a portion of the content stream to a group of human users to identify the item offered for acquisition within the content stream.

17. A method as recited in claim 14, further comprising:
  receiving feedback from users that have previously consumed the content stream, and wherein the feedback includes an identification of the item;
  verifying the item based at least partly on the user feedback; and
  updating, in response to a threshold number of users providing feedback, the identification of the item.

18. A method as recited in claim 14, wherein the content stream being output by the content output device comprises a video, an audio stream, or both.

19. A method as recited in claim 14, wherein the determined information pertaining to the item comprises a name of the item, an image of the item, an offering service that offers the item, a price of the item, an availability of the item, options associated with the item, a rating of the item, a review associated with the item, or a combination thereof.

20. A method as recited in claim 14, wherein the determined information pertaining to the item comprises an overlay allowing a user consuming the content stream to request more information about the item.

21. A method as recited in claim 14, wherein the content stream being output by the content output device is being broadcast to the content output device in substantially real time.

22. A method as recited in claim 14, wherein the monitoring of the content stream is triggered at least partly in response to receiving an instruction from a user consuming the content stream.

23. A method as recited in claim 14, further comprising identifying an advertisement for the item offered for acquisition at least partly in response to the monitoring of the content stream, and wherein the identifying of the item occurs at least partly in response to the identifying of the advertisement.

24. A method as recited in claim 14, wherein the content stream being displayed by the content output device comprises a television broadcast signal.

25. A system comprising:
  one or more processors;
  memory accessible by the one or more processors;
  a monitoring module, stored in the memory and executable on the one or more processors to detect a content identifier (ID) within a content stream being broadcast to a content output device, the content ID being associated with an item, the content ID being recognized in one or more frames of the content stream, the content ID being inserted into the content stream at a location that is at least one of:
    adjacent to an image of the item,
    outside of a viewable area of a display of the content output device displaying the content stream, or
    inside of a viewable area of a display of the content output device displaying the content stream,
    wherein the content ID, having been inserted into the video stream, is imperceptible to a human viewing the content output device based on at least one of a size of the content ID or a number of frames used to display the content ID; and
  an output module stored in the memory and executable on the one or more processors to output, on the content output device and with the content stream, information pertaining to the item at least partly in response to the monitoring module detecting the content ID.

26. A system as recited in claim 25, wherein the content stream comprises a plurality of content identifiers (IDs) and respective content, provided in the one or more frames, and at least some of the content IDs comprise barcodes or universal product codes (UPCs) associated with respective items, and wherein the monitoring module is executable on the one or more processors to locate the barcodes or the UPCs associated with the respective items.

27. A system as recited in claim 26, wherein the monitoring module is executable on the one or more processors to locate the content IDs associated with the respective portions of the content stream.

28. A system as recited in claim 27, wherein at least one of the portions of the content stream comprises an advertisement for the respective item.

29. A system as recited in claim 26, further comprising a mapping module, stored in the memory and executable on the one or more processors to map each located content ID to the respective item.

30. A system as recited in claim 25, wherein the content stream being displayed by the content output device comprises a video stream, an audio stream, or both.

31. A system as recited in claim 25, wherein the content ID comprises a barcode or a universal product code (UPC) identifying the item.

* * * * *